United States Patent
Jaycobs et al.

(10) Patent No.: US 10,956,978 B2
(45) Date of Patent: *Mar. 23, 2021

(54) SYSTEMS AND METHODS OF DETECTING MANIPULATIONS ON A BINARY OPTIONS EXCHANGE

(71) Applicant: CFPH, LLC, New York, NY (US)

(72) Inventors: Rich Jaycobs, Burlington, MA (US);
Nolan Glantz, Burlington, MA (US);
James Les Walker, Maynard, MA (US)

(73) Assignee: CFPH, LLC, New York, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/390,916

(22) Filed: Apr. 22, 2019

(65) Prior Publication Data

US 2019/0251631 A1  Aug. 15, 2019

Related U.S. Application Data

(63) Continuation of application No. 13/832,955, filed on Mar. 15, 2013, now Pat. No. 10,304,130.

(Continued)

(51) Int. Cl.
*G06Q 40/04* (2012.01)
*G06Q 40/06* (2012.01)
(Continued)

(52) U.S. Cl.
CPC .......... *G06Q 40/04* (2013.01); *G06F 3/0488* (2013.01); *G06F 3/04842* (2013.01); *G06F 3/04883* (2013.01); *G06F 2203/04806* (2013.01)

(58) Field of Classification Search
CPC ...... G06Q 40/00; G06Q 40/06; G06Q 20/382; G06Q 40/04; G06F 3/04842; G06F 3/0488; G06F 3/04883
(Continued)

(56) References Cited

U.S. PATENT DOCUMENTS

| 5,913,197 A | 6/1999 | Kameda |
|---|---|---|
| 6,590,577 B1 | 7/2003 | Yonts |

(Continued)

FOREIGN PATENT DOCUMENTS

| JP | 2003-108774 | 4/2003 |
|---|---|---|
| JP | 2013-156902 | 1/2012 |

(Continued)

OTHER PUBLICATIONS

Notification of Transmittal of the International Search Report and the Written Opinion of the International Searching Authority dated Jul. 28, 2014 for International Application No. PCT/US2014/017662; 7 pages.

(Continued)

*Primary Examiner* — Clifford B Madamba

(57) ABSTRACT

Methods, apparatuses and article of manufactures for receiving a plurality of bids and offers for a binary options transaction. Each bid and offer comprises a quantity and a price. At least one rule is applied to the plurality of received bids and offers. At least one of the plurality of bids and offers is determined to be potentially manipulative. An alert that the at least one bid or offer is potentially manipulative is transmitted.

20 Claims, 9 Drawing Sheets

Related U.S. Application Data

(60) Provisional application No. 61/768,117, filed on Feb. 22, 2013.

(51) Int. Cl.
  *G06Q 40/00* (2012.01)
  *G06F 3/0488* (2013.01)
  *G06F 3/0484* (2013.01)

(58) Field of Classification Search
  USPC .......................................................... 705/37
  See application file for complete search history.

(56) References Cited

U.S. PATENT DOCUMENTS

| | | | |
|---|---|---|---|
| 7,779,466 B2 | 8/2010 | Judge et al. | |
| 7,953,647 B2 | 5/2011 | Bolivar | |
| 8,527,909 B1 | 9/2013 | Mullany | |
| 8,630,938 B2 * | 1/2014 | Cheng | G06Q 20/382 |
| | | | 705/37 |
| 9,881,337 B2 | 1/2018 | Patwardhan et al. | |
| 10,242,403 B2 | 3/2019 | Jaycobs et al. | |
| 2002/0154173 A1 | 10/2002 | Etgen et al. | |
| 2002/0169704 A1 | 11/2002 | Gilbert et al. | |
| 2004/0111358 A1 | 6/2004 | Lange et al. | |
| 2006/0031156 A1 | 2/2006 | Noviello et al. | |
| 2006/0267982 A1 | 11/2006 | Aguera y Arcas | |
| 2009/0150273 A1 | 6/2009 | Lehman | |
| 2011/0087586 A1 | 4/2011 | Jackson et al. | |
| 2011/0276456 A1 | 11/2011 | Tzroya | |
| 2011/0316884 A1 | 12/2011 | Giambalvo et al. | |
| 2012/0041862 A1 | 2/2012 | Bul et al. | |
| 2012/0221456 A1 | 8/2012 | Lutnick et al. | |
| 2012/0235933 A1 | 9/2012 | Yamamura et al. | |
| 2012/0254062 A1 * | 10/2012 | Labsuzewski | G06Q 40/06 |
| | | | 705/36 R |
| 2013/0246305 A1 * | 9/2013 | Speth | G06Q 40/00 |
| | | | 705/36 R |
| 2014/0244466 A1 | 8/2014 | Jaycobs et al. | |
| 2014/0244467 A1 | 8/2014 | Jaycobs et al. | |
| 2014/0245171 A1 | 8/2014 | Jaycobs et al. | |
| 2018/0122009 A1 | 5/2018 | Jaycobs et al. | |
| 2019/0172140 A1 | 6/2019 | Jaycobs et al. | |

FOREIGN PATENT DOCUMENTS

| | | |
|---|---|---|
| JP | 2012-181864 | 5/2012 |
| JP | 2012-513071 | 6/2012 |
| WO | 2014/062233 | 4/2014 |

OTHER PUBLICATIONS

Supplemental European Search Report for App. No. 14754586.7; dated Oct. 4, 2016; 6 pages.

Thiel, John, "binary Option Indices: Best Brokers and Recommended Trading Strategies." Binary Option reports, Archived Sep. 14, 2012 (accessed Mar. 23, 2015) http://binaryoptionsreports.com/binary-options-indices-best-brokers-and-recommended-trading-strategies/.

JP Office Action for App. No. 2015-558995; dated Jan. 30, 2018; 7 pages (w/English translations).

JP Notice of Allowance for App. No. 2015-558995; dated May 22, 2018; 4 pages (w/English translations).

Israeli Office Action for App. No. 240702 dated Dec. 3, 2018; 6 pages (w/English translations).

\* cited by examiner

SYSTEMS AND METHODS OF DETECTING MANIPULATIONS ON A BINARY OPTIONS EXCHANGE

CROSS REFERENCE TO RELATED APPLICATIONS

This patent application is a continuation application of U.S. patent application Ser. No. 13/832,955 filed Mar. 15, 2013, which claims the benefit of U.S. Provisional Application No. 61/768,117, filed on Feb. 22, 2013, the disclosures of which are hereby incorporated by reference herein in their entireties.

FIELD OF THE INVENTION

Some embodiments may relate to trading binary options. In particular, the trading of binary option on a mobile device.

DETAILED DESCRIPTION

I. Example Embodiments

Figure 1:
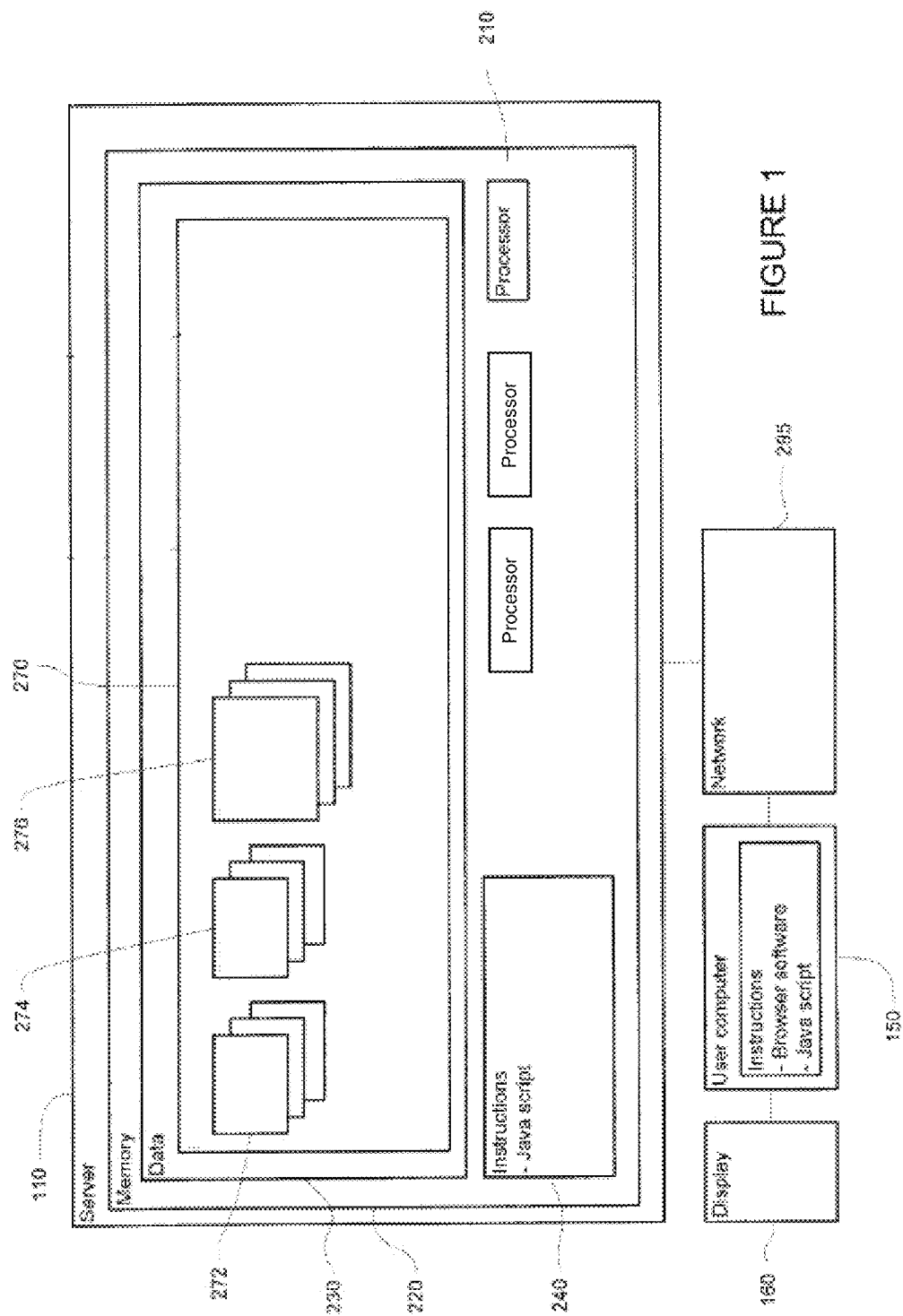
FIG. 1 is a block diagram of a system in accordance with an aspect of the invention.
Figure 2:
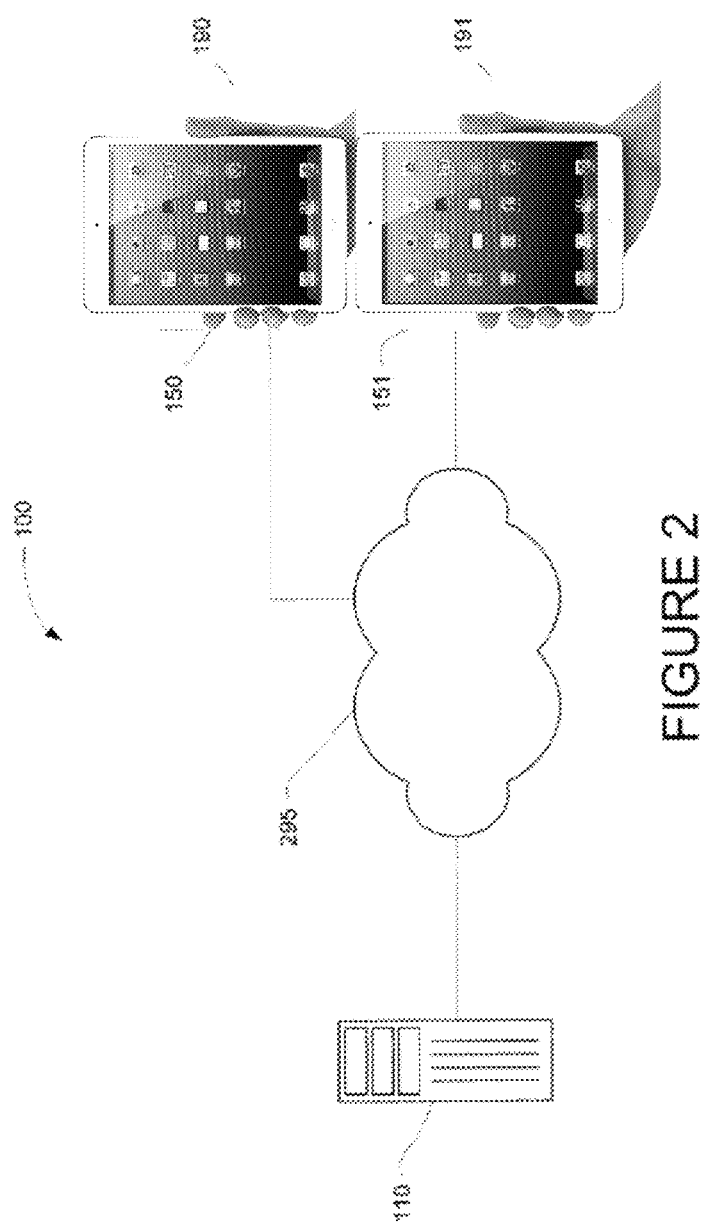
FIG. 2 is a pictorial block diagram of a system in accordance with an aspect of the invention.

As shown in FIGS. 1-2, a system 100 in accordance with one aspect of the invention includes a server 110 containing a plurality of processors 210, memory 220 and other components typically present in general purpose computers.

Memory 220 stores information accessible by at least one processor 210, including instructions 240 that may be executed by the processor 210, and data 230 that may be retrieved, manipulated or stored by the processor. The memory may be of any type capable of storing information accessible by the processor.

The instructions 240 may be any set of instructions to be executed directly (such as machine code) or indirectly (such as scripts) by the processor. In that regard, the terms "instructions," "steps" and "programs" may be used interchangeably herein. The instructions also function as an algorithm allowing the processor to perform the purposes intended by the instructions. The instructions may be stored in object code form for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the invention is not limited by any particular data structure, the data may be stored in computer registers, in a relational database as a table having a plurality of different fields and records, XML documents, or flat files. The data also may be formatted in any computer readable format such as, but not limited to, binary values, ASCII or Unicode. Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In at least one embodiment, server 110 is a server communicating with one or more client devices 150-151. Each client device may be configured similarly to server 110, with a processor, memory and instructions. Each client device 150-151 may be a mobile device, such as an iPad, intended for use by a person 190-191, having all the internal components normally found in a tablet device such as a central processing unit (CPU), display 160, hard-drive, user input devices (for example, touch-screen, microphone, Bluetooth mouse, wireless keyboard, augment reality spectacles), speakers, wireless modem and/or network interface device and all of the components used for connecting these elements to one another. Moreover, client devices in accordance with the systems and methods described herein may comprise any device capable of processing instructions and transmitting data to and from humans and other computers, including mobile devices, personal computers, smart phones, general purpose computers, network computers lacking local storage capability, Personal Digital Assistant (PDA) with modems and Internet-capable wireless phones, any augmented reality devices, such as Google Glasses.

Server 110 and client devices 150-151 are capable of direct and indirect communication, such as over a network 295. Although only a few tablet devices are depicted in FIGS. 1-2, it should be appreciated that a typical system can include a large number of wireless computing devices, with each different computing device accessing a different node of the network 295. The network and intervening nodes may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. Server 110 may be a web server.

Although certain advantages are obtained when information is transmitted or received as noted above, other aspects of the invention are not limited to any particular manner of transmission of information. For example, in some aspects, the information may be sent via a medium such as a disk, tape or CD-ROM. In other aspects, the information may be transmitted in a non-electronic format and manually entered into the system. Yet further, although some functions are indicated as taking place on a server and others on a client, various aspects of the invention may be implemented by a single computer having a single processor.

The data 230 includes database 270. Database 270 provides market data 274 in response to requests for information associated with a particular binary options instrument. The system and method is not limited to a specific manner of expressing the binary options market data.

The system and method is not limited to a particular type or format. The market data 270 may be in any data format. Market data may be any relevant information of interest to customers seeking to execute a transaction on a binary options instrument. A user using client device 150 may request market data information by connecting to server 110.

FIGS. 3-7 illustrate how a screen in accordance with an aspect of the system and method may look to a customer seeking to make a binary options transaction.

Figure 3:
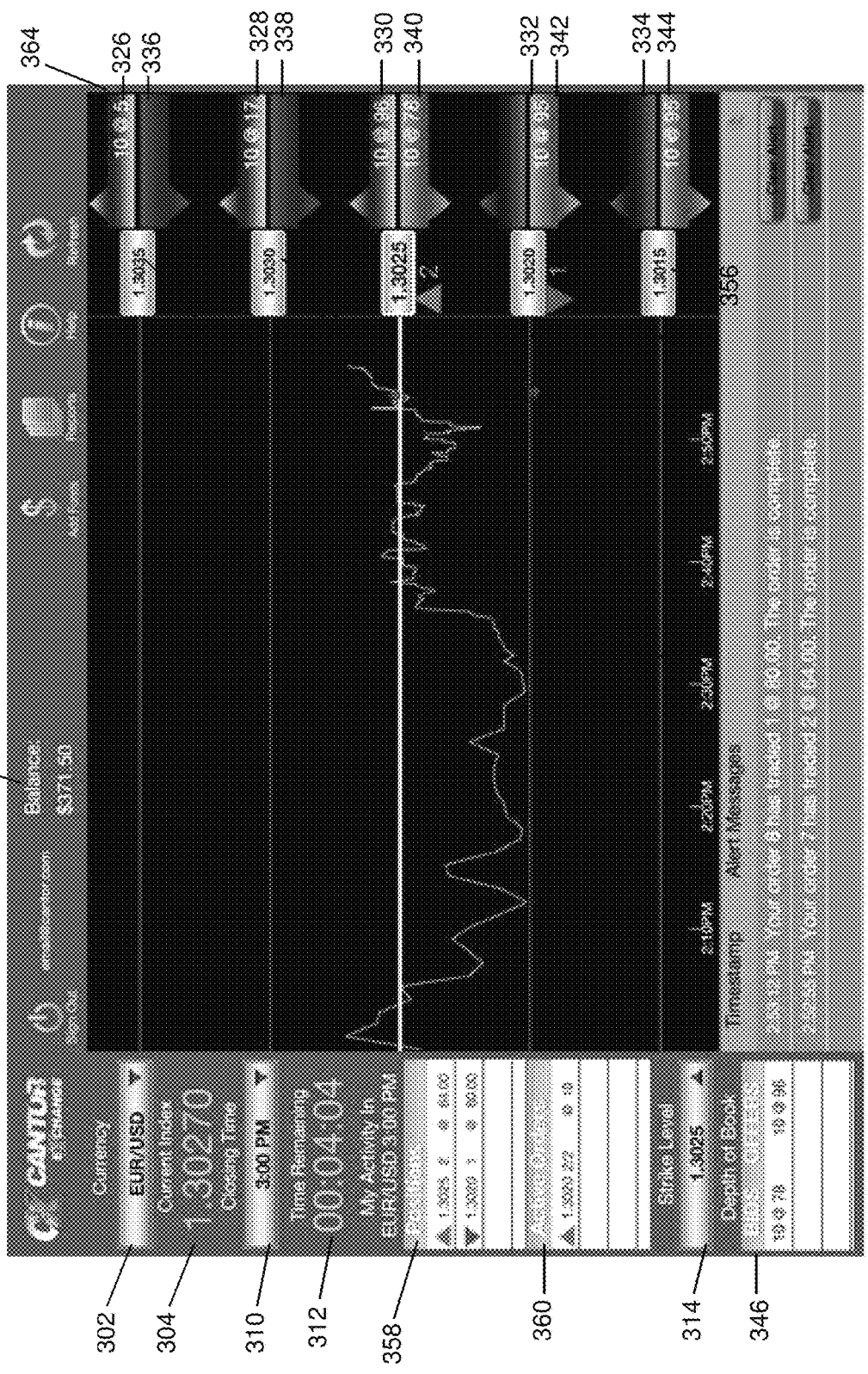
FIGS. 3-4c illustrates an exemplary screenshots of an interface.

FIG. 3 illustrates a screenshot of binary options interface 300. When binary options interface 300 is used on a tablet device, it is desirable for binary options interface 300 to convey as much information as possible without necessitating the opening of a new webpage or window. In some embodiments, binary options interface 300 may employ features, such as pull-down menus, side columns, scrolling, stretch-to-expand, pinch-to-shrink and dragging gestures, in order to maximize the information provided on the limited screen space.

In one embodiment, a user may select the binary options instrument via pull down menu 302. System 100 is capable of handling any type of instrument, including but not limit to, financial instruments, S&P 500 indices, oil & gas indices, real estate indices, futures indices, etc. In other words, any risk derivative that is subject to a "yes" or "no" proposition may be transacted via system 100. In the example illustrated in FIG. 3, pull-down menu 302 offers a selection of currency pairs from which the user selects the EUR/USD currency pair.

Upon selection of an instrument, binary options interface 300 displays real-time market data for the selected instrument. In one embodiment, the market data is shown in display box 304. The market data also may be displayed via price graph 306 which is featured in graphical section 308. As the market data fluctuates throughout the day, both display box 304 and price graph 306 are updated continuously in real-time.

Although FIG. 3 illustrates the market data in the form of a linear graph, system 100 is capable of displaying the market data in any number of different formats, such as stacks, bar graphs, scatter plots, etc. . . .

System 100 may receive market data from any number of providers. These provides may be banks, broker dealers, hedge funds and/or other vendors. The market data may be updated at any number of time intervals. In one embodiment, as illustrated in FIG. 3, the market data is updated at a sampling rate of every half second. This sampling rate may be determined in advance by any number of sources. In one embodiment, the sampling rate is determined by the market data provider. In another embodiment, system 100 determines a default sampling rate. In another embodiment, the customer determines the sampling rate. The customer also may have the option to change the sampling rate during her use of system 100. In another embodiment, only select customers are provided with the option to change the sampling rate. System 100 may grant "select" status to certain customers based on any number of factors, such as their trading history, their frequency of trade, quantity of their previous transactions, quantity of "trading" dollars purchased, and the amount of money they have previously spent or earned using system 100.

Upon receiving the market data, system 100 processes the data before displaying the information in display box 304 and price graph 306. In one embodiment, system 100 will determine the highest bid price and lowest offer price and display those numbers. In another embodiment, system 100 displays an index of the received bids and offers in display box 304 and price graph 306. This index may be calculated via a variety of techniques.

In one embodiment, system 100 computes the index by averaging of all received bids and offers.

In another embodiment, the index is computed from a subset of bids and offers, in which the subset does not consists of all received bids and offers. For example, binary options 100 may select the six most recently received bids and offers, and compute the index using this subset of bids and offers. Any permutation, where the index is computed from a subset that does not consists of all received bids and offers, is permitted by system 100.

In one embodiment, at least one rule is applied to the received bids and offers before an average is computed for the index. The rule may be applied to all of the received bids and offers, or the rule may be applied to a subset of the bids and offers.

In one embodiment, the rule may consist of removing the highest and lowest bids and offers. The index is then computed from this reduced subset. The rule may encompass any variant of this removal, such as removing the top two and bottom two highest/lowest bids and offers.

Another rule may consist of comparing each bid and each offer against a threshold quantity amount. Any bid or offer with a quantity that falls below the minimum threshold amount is removed. For instance, binary options interface 100 may only wish to list bids and offers with a minimum quantity of 1M. Therefore, any bids or offers that fails to meet the minimum quantity threshold is removed from the subset. Again, the index is then computed from this reduced subset.

Another rule may consist of comparing each bid and each offer against a threshold price amount. For example, any bid that is too low (e.g. does not meet a minimum price amount) may be removed before the index is computed. Conversely, any offer that is too high (e.g. does not meet a maximum price amount) may be removed from the subset as well.

System 100 may seek to remove an order that appear to be manipulative or provided in error. In one embodiment, the rule may remove any suspicious bids or offers by applying a threshold price amount. For example, any bids that are unusually high (e.g. does not meet a maximum price amount), or any offers that are unusually low (e.g., does not meet a minimum price amount) are removed before the index is computed. Another rule may compare all received bids and offers against a standard of deviation, so that any bids or offers that fall outside the standard of deviation are removed.

System 100 also may employ rules that makes it more difficult to predict. For example, system 100 may apply a rule which randomly selects one or more bids and offers to be removed before computing the index. To apply this rule, system 100 may determined a periodic pattern in the received market data, and then attempt to deviate from that periodic pattern.

In one embodiment, system 100 uses the order position of a bid or offer. For example, the rule may consists of removing every tenth bid and offer that is received by system

100. In one embodiment, system 100 also may use a randomizer to generate the order position that is to be removed.

In another embodiment, system 100 removes all bids at a particular bid price or all offers at a particular offer price. The particular bid and offer prices are randomly selected and may change from time to time. For example, system 100 may remove any EUR/USD rate that hits a specific value from the subset before calculating the index.

In another embodiment, system 100 removes all bids having a particular quantity, or all offers with a particular quantity. This particular quantity also may be randomly selected and may change from time to time.

In one embodiment, the detection of a potentially manipulative bid or offer may trigger an alert to be sent to an administrator of system 100. In another embodiment, system 100 automatically flags any potentially manipulative bids or offers and identify their source. System 100 may transmit an alert regarding the source of the manipulative bids or offers. An offender who exceeds a threshold quantity of alerts may be prevented from posting on system 100. In another example, any offers with a manipulative order that exceeds a threshold amount may be prevented immediately from posting on system 100. In another example, system 100 alerts a system administrator for further evaluation.

In one embodiment, system 100 calculates a weighted value for each received bid and offer. This weighted value is computed by combining the quantity amount and the bid/offer price. This weighted value also may be used when computing the index and/or when applying one of the rules.

Referring back to FIG. 3, a user of system 100 also may select a closing time for the binary options transaction. Using pull-down menu 310, the user selects from a plurality of available closing times. System 100 may offer closing times at any number of time intervals. For example, the closing times may occur every hour, half hour, every two hours, every fifteen minutes, once a day, or any other increment of time. In one embodiment, binary options interface 300 does not offer any choices on the future closing time. Instead, the user is automatically assigned to the next available closing time.

Once the user selects a closing time, in one embodiment, timer 312 displays a countdown of the remaining time until expiration of the selected closing time. A user may wish to reference timer 312 in determining whether to place another bid or offer on binary system 100.

In one embodiment, the user also can view the amount of money remaining her balance via box 322. She may purchase additional trading dollars by clicking on an appropriate icon on the display screen. In one embodiment, she may add trading dollars by providing a valid credit card number. In another embodiment, she may have the funds transferred from a banking institution.

The user also may select a strike level (or strike price) for the selected instrument via pull-down menu 314. Any strike level that is available for a binary options transaction may appear in pull-down menu 314. In response to the user's selection, a corresponding strike line is highlighted in graphical section 308.

At this point, any bids and offers place by the user would be specific to the selected strike level at the selected closing time. For example, in the illustrated example of FIG. 3, the user selects a strike level of 1.3025 and a closing time of 3:00 pm. In response to the user's selection, strike line 316 is highlighted in graphical section 308. When placing a bid or offer, the user will need to determine whether she believes that the currency index (as depicted by price graph 306) will end up either above or below the strike level of 1.3025 at 3:00 pm. If the user believes that the answer is "yes" (i.e., the currency index for EUR/USD will close "in the money," or above the selected strike level of 1.3025), she would purchase a Call/Up option (i.e., submit an bid to buy). Conversely, if the user believes that the answer is "no" (i.e., the currency index for the EUR/USD will end below the selected strike level of 1.3025), she would purchase a Put/Down option (i.e., submit an offer to sell). If the user wishes to place a bid or offer for a differ strike level, she would select another strike level using pull-down menu 314.

When placing the bid or offers, the user may rely on a variety of information to inform her decision. This information may be displayed on binary options interface 300. In one embodiment, graphical interface 308 displays information pertaining to the best available markets for each strike price. This information may be displayed next to the corresponding strike line. As shown in FIG. 3, a plurality of strikes lines are displayed in graphical section 308 along vertical axis 364. Each strike line 316-324 has a corresponding pair of market boxes 326-344. Market boxes 326-334 display the headline bid (or best bid) for its corresponding strike price. Each of market boxes 326-334 appear above its corresponding strike line. Similarly, market boxes 336-344 display the headline offer (or best offer) for its corresponding strike price. Each of market boxes 336-344 appear below its corresponding strike line. The information displayed in market boxes 326-344 show the available quantity and the best available price for its corresponding strike level. For example, market box 330 lists "10 @ 96," which indicates that at the present time the best available bid at strike level 1.3025 is a quantity of 10 at an average price of $96. Likewise, market box 340 lists "10 @ 78," which indicates that at the present time the best available offer at strike level 1.3025 is a quantity of 10 at a price of $78.

In one embodiment, binary options interface 300 shows the market depth for the selected strike level by displaying the next best bids and next best offers in display box 346. Referring back to the example shown in FIG. 3, for strike level 1.3025, the best bid price at the present time is $96 (as shown in market box 340). If a user desires to buy a quantity that is great than 10, she then refers to the other bids listed in display box 346.

Furthermore, each time that a user selects a strike level through pull-down menu 314, display box 346 automatically updates to display the market depth information for that selected strike level.

Both display box 346 and market boxes 326-344 are dynamically updated in real-time. Any time that a liquidity provider opens a new market, this new market appears on binary options interface 300. If the new market is replacing a headline offer or bid of a strike level, then the corresponding market box for that strike level is updated accordingly. The previous headline offer or bid is moved to display box 346.

In one embodiment, display box 346 lists the headline bids and offers, as well as the other available next best bids and offers are hidden from the initial view of binary options interface 300. In one embodiment, the user swipes the touch-screen in a down-up motion in order to scroll below to see additional next best bids and offers. In another embodiment, the user double taps on display box 346, which displays a pop-up window that displays all available next best bids and offers At any point during a binary options transaction, a user may desire to view additional information from graphical section 308. In particular, the user may wish to manipulate the images displayed in graphical section 308, such as zooming in, zooming out, viewing past data points, or viewing additional strike levels.

As shown in FIG. 3, graphical section 308 comprises horizontal axis 362 and vertical axis 364. Time increments are distributed along horizontal axis 362, and strike levels are distributed along vertical axis 364. In one embodiment, system 100 comprises a centering mechanism, which detects the current market index and automatically displays price graph 306 in the center of vertical axis 364. In one embodiment, the user double taps anywhere on graphical area 308 to re-center the price graph 306.

There are various ways in which a user can manipulate the data displayed in graphical section 308. A user may desire certain operations such as scrolling, selecting, gesturing, and animating operations for a display of the device.

In one embodiment, a user views past market data by scrolling. Scrolling is the act of sliding in a direction (e.g., horizontal or vertical) to view additional content, such as text, drawings, or images, across a screen or display window. In a typical graphical user interface, scrolling may be performed by a dragging gesture of the finger. In another embodiment, scrolling maybe be done with the help of a scrollbar or using keyboard shortcuts, such as arrow keys. For example, the user may drag her finger in a vertical direction in order to see additional strike levels (and their corresponding market boxes). The user also may drag her finger in a horizontal direction to view different time periods of price graph 306, if the full graph history is not in view.

In another embodiment, the user acquires additional information by performing a gesture, such as a stretch-to-expand or pinch-to-shrink gesture on the touchpad screen. Gesturing is a type of user input with two or more input points. Animating operations include changing content within a given time period. The stretch-to-expand or pinch-to-shrink gesture result in a scaling transformation such as a zoom-in or zoom-out functionality. The gesture operations also include performing a rotation transform to rotate an image or view in response to a user input having two or more input points.

When a user employs a stretch-to-expand gesture, she increases the frequency by which the time intervals are sampled along horizontal axis 362. Price graph 306 is now displayed over a shorter period of time. The stretch-to-expand gesture also decreases the number of strike levels that are displayed along vertical axis 364. As a result, the stretch-to-expand gesture causes a zoom-in effect of price graph 306. In one embodiment, system 100 monitors the quantity of stretch-to-expand gestures received on the touch screen, in order to determine the percentage by which price graph 306 should be enlarged. For example, in one embodiment, a single stretch-to-expand gesture may result a first scaling factor (e.g., a 25% magnification), whereas two stretch-to-expand gestures may result in a second scaling factor (e.g., 50% magnification) of price graph 306.

Figure 4A:
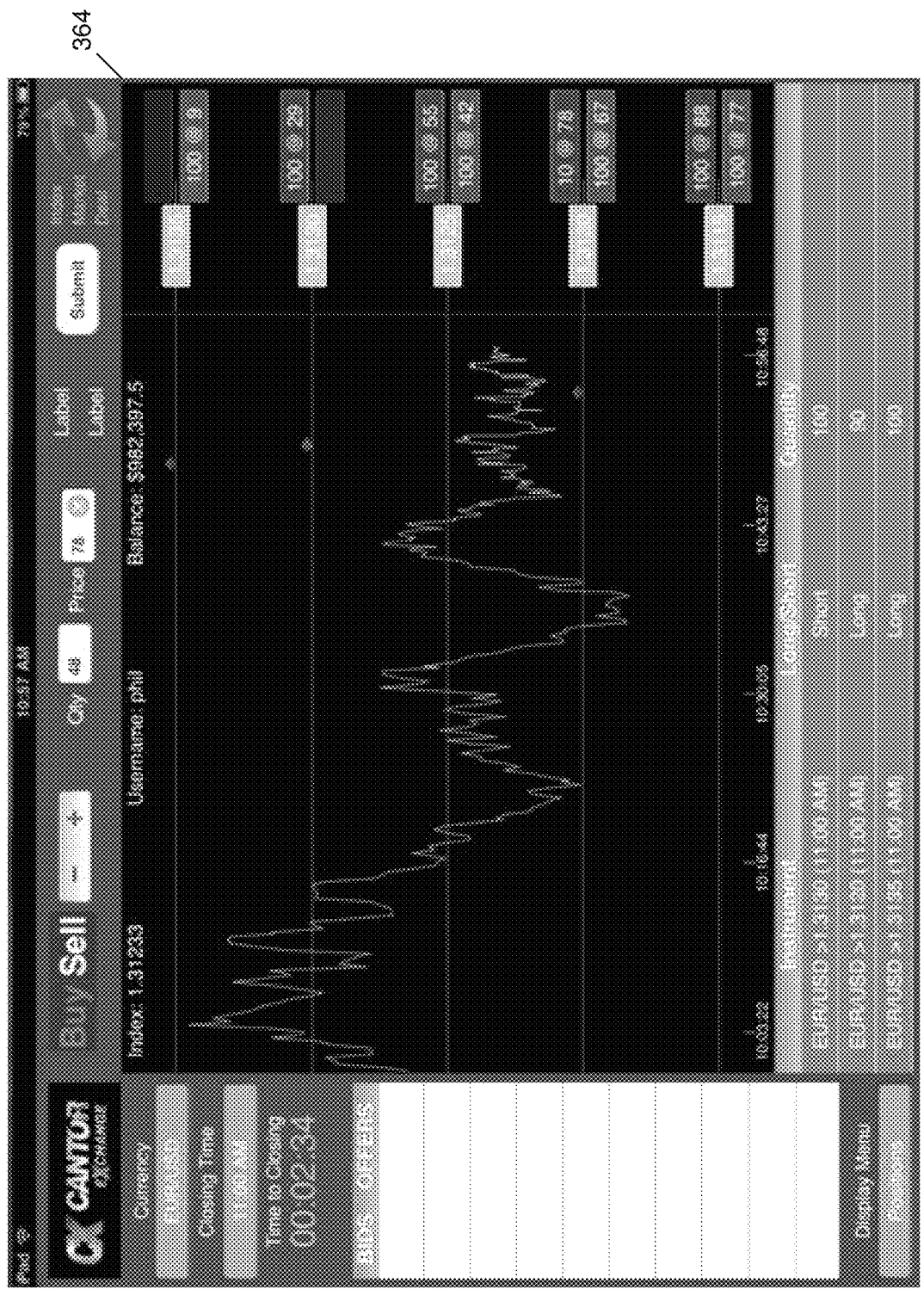
Figure 4B:
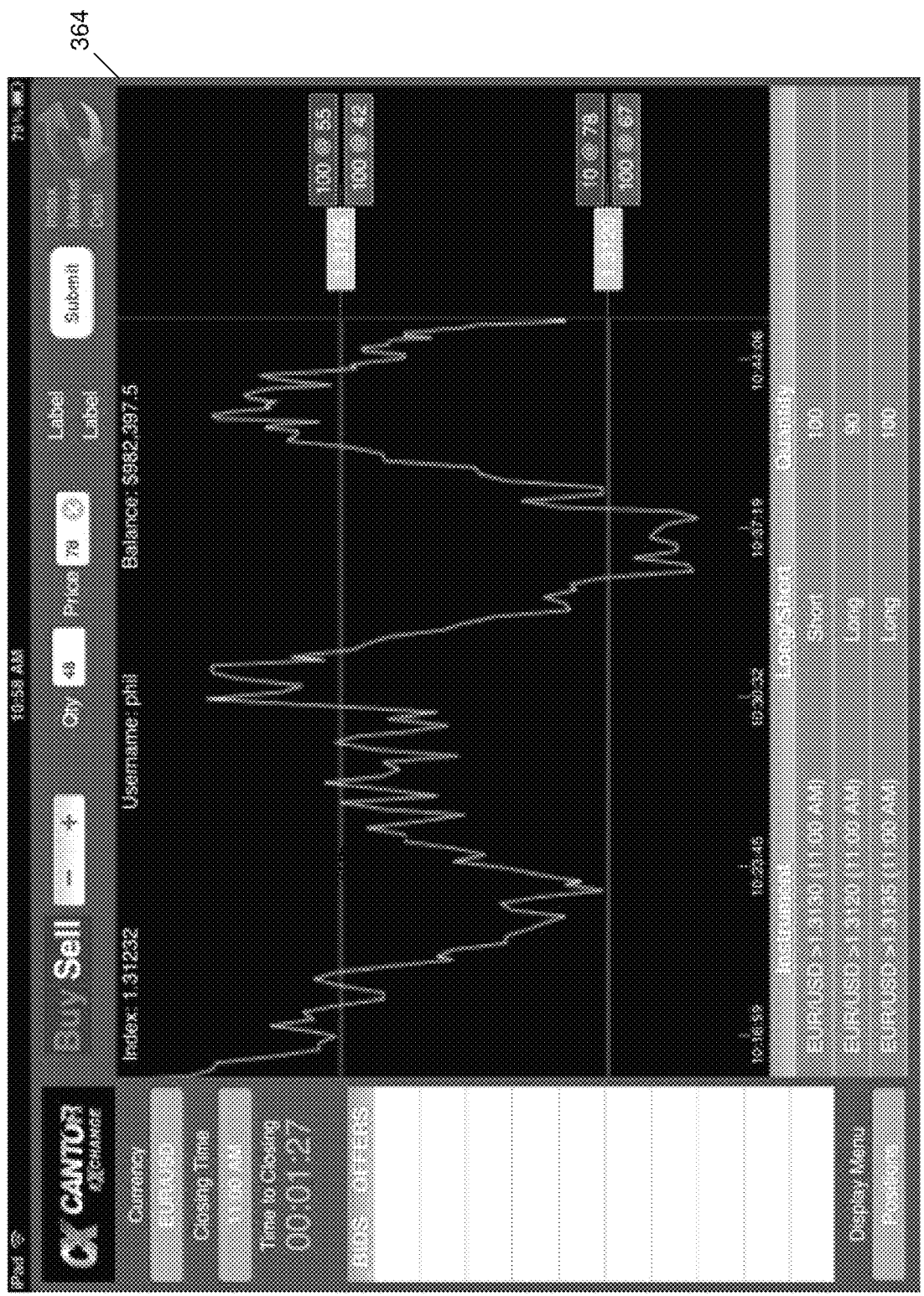

FIG. 4a illustrates a screenshot of binary options interface 300 in a default setting. In the illustrated example, there are five strike levels displayed along vertical axis 364 and the time intervals along horizontal axis 362 are sampling at approximately every 14-sec. Price graph 306 is displayed over approximately a 53-sec period of time. By contrast, FIG. 4b illustrates a screenshot of binary options interface 300 after the user has performed a stretch-to-expand gesture. Price graph 306 is now displayed over a shorter period of time: 28-sec. The sampling rate along horizontal axis 362 increases from sampling at every 14 seconds to sampling at every 7-sec time intervals. The zoom-in effect on graphical section 308 also decreases the quantity of displayed strike levels. Where as FIG. 4a shows five strike levels along vertical axis 364, FIG. 4b now shows two strike levels.

When a user employs a pinch-to-shrink gesture, she decrease the frequency by which the time interval are sampled along horizontal axis 362. Price graph 306 is now displayed over a longer period of time. The pinch-to-shrink gesture also increases the number of strike levels that are displayed along vertical axis 364. As a result, the pinch-to-shrink gesture causes a zoom-out effect of price graph 306. In one embodiment, system 100 monitors the quantity of pinch-to-shrink gestures received on the touch screen, in order to determine the percentage by which price graph 306 should be reduced. For example, in one embodiment, a single pinch-to-shrink gesture may result a first scaling factor (e.g., 25% reduction), whereas two stretch-to-expand gestures may result in a second scaling factor (e.g. 50% reduction) of price graph 306.

Figure 4C:
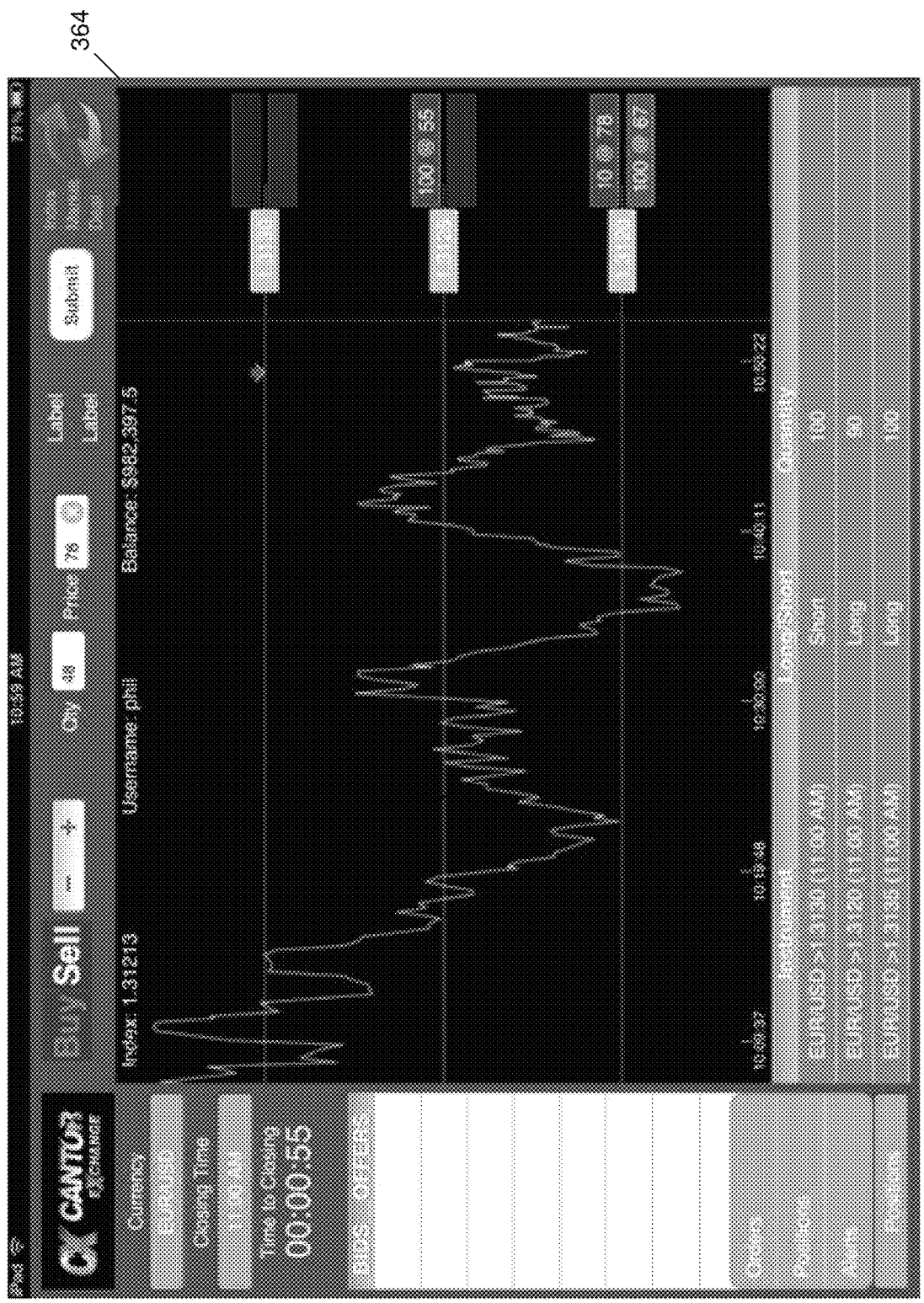

FIG. 4c illustrates a screenshot of binary options interface 300 after the user has performed a pinch-to-shrink gesture. Compared with the price graph 306 that is displayed in FIG. 4b, price graph 306 is displayed over a longer period of time (41-sec) in FIG. 4c. The sampling rate along horizontal axis 362 decreases from sampling at every 7 seconds to sampling at every 10-sec time intervals. The zoom-out effect on graphical section 308 also increases the number of displayed strike levels from two to three.

In one embodiment, the transition between each of the pinch-to-shrink and stretch-to-expand gestures is completely seamless. The user does not, at any time, experience a break in the image of price graph 306 that is displayed in graphical section 308. System 100 accomplishes this seamless display of price graph 306 through a number of different methods.

In one embodiment, system 100 uses an anticipatory zoom technique that interpolates between known data points in order to generate an initial image of price graph 306. System 100 then retrieves the actual data points and updates the initial image with the actual data points. Because the initial image is based on interpolated data, the image will be fairly similar to the subsequent image that is generated from the actual data points. As such, the user does not perceive any significant changes between the initial image and the subsequent image of price graph 306.

In another embodiment, system 100 uses an anticipatory retrieval technique that retrieves in advance a small cache of data points in anticipation of a stretch-to-expand or pinch-to-shrink gesture from the user.

In one embodiment, the anticipatory retrieval technique requires system 100 to monitor the user's location. The user's location may be based on any number of ways, such as detecting the pressure of a finger against the touch screen, the location of a cursor, or where the user is looking through augmented reality spectacles. System 100 then corresponds the user's location to a position on price graph 306, and then retrieves data points within a pre-defined area surrounding the position. This retrieved data is stored locally and may be easily and quickly accessed. If the user performs a gesture, such as stretch-to-expand, pinch-to-shrink and/or scrolling, system 100 is able to transition into an updated image of price graph 306 in a continuous manner, because it does not need to pause to retrieve the data.

In another embodiment, system 100 identifies a perimeter surrounding price graph 306. The perimeter may include a beginning point and end point to price graph 306. In advance of receiving any request from the user, system 100 retrieves a set of data points located outside the perimeter. In other words, system 100 anticipates that a user may wish to scroll beyond the displayed data. Again, because the data is retrieved in advance, the user experiences a seamless transition in the displayed image because system 100 does not need to pause to retrieve the data after the request.

In another embodiment, the anticipatory retrieval technique is triggered upon the detection of a stretch-to-expand or pinch-to-shrink gesture. The detection of a stretch-to-expand or pinch-to-shrink gesture may trigger system 100 to retrieve the data points that correspond to a subsequent stretch-to-expand or pinch-to-shrink gesture. In another embodiment, the anticipatory retrieval technique is not triggered until a quantity of stretch-to-expand or pinch-to-shrink gestures have been detected. The quantity may be calculated within a period of time, such as receiving two stretch-to-expand gestures within a 5-second interval.

Any of the techniques described above may be used individually or in combination to provide a seamless transition between each of the detected scrolling, gestures or manipulations from the user.

Figure 5:
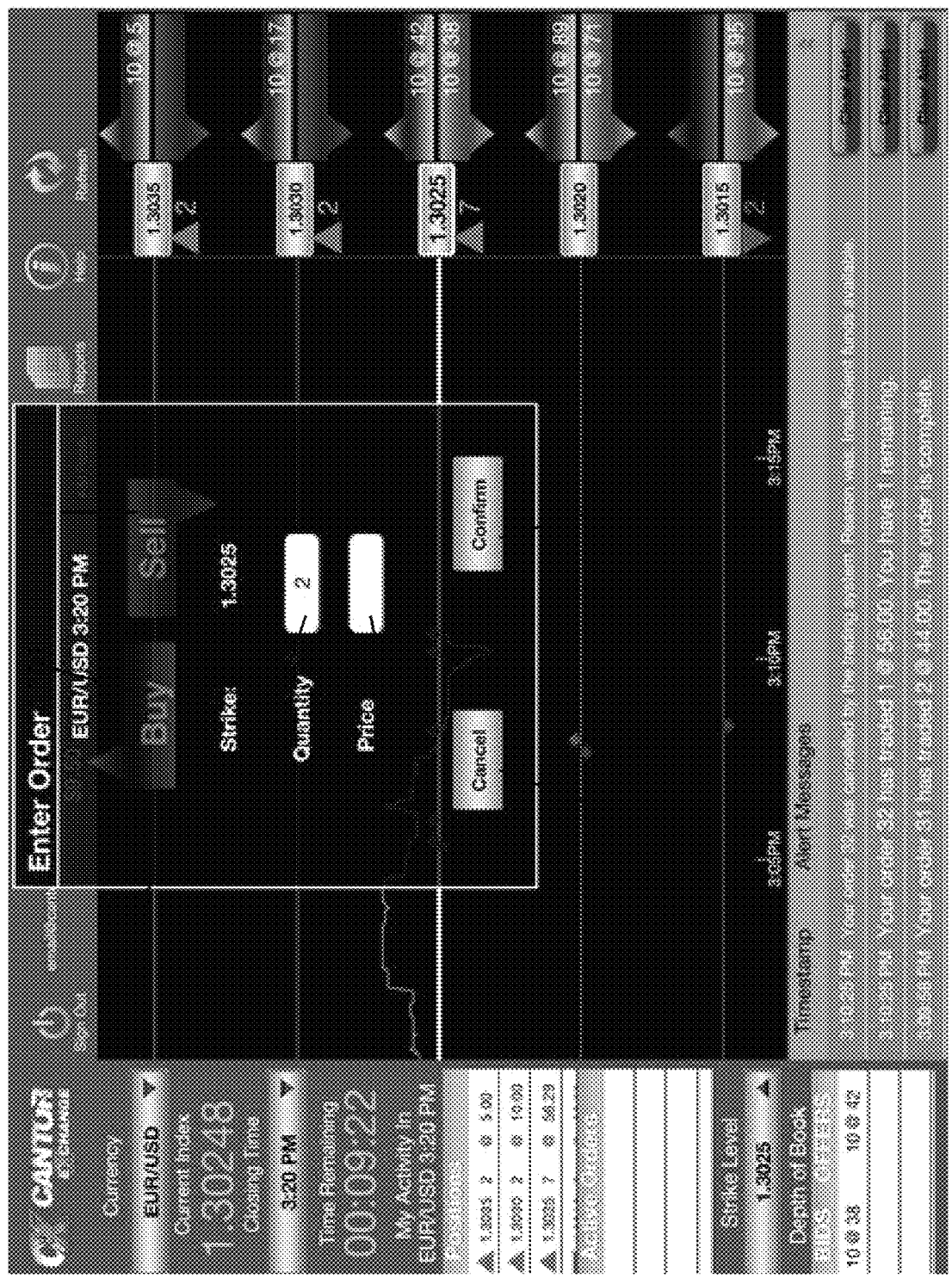
FIG. 5 illustrates an exemplary example of an order entry window.

FIG. 5 illustrates a screenshot of binary options interface 300 after the user has indicated a desire to trade an order. There are a number of different ways in which a user may cause order entry window 500 to appear on binary options interface 300. In one embodiment, order entry window 500 appears after the user taps on any region of graphical section 308. In another embodiment, order entry window 500 appears after the user taps on one of icons 348-356, which are located proximate to its corresponding strike lines 316-324. In yet another embodiment, order entry window 500 appears after the user taps on one of market boxes 326-344.

In one embodiment, order entry window 500 automatically populates quantity input 502 and price input 504 with default settings. These default settings may be a quantity amount or price that is determined in advance by any number of sources. In one embodiment, system 100 determines the default quantity amount in advance. The current market price of the bid or offer is used for the price of the transaction. For example, as shown in FIG. 5, the default quantity amount is 10, and the default price is the market price.

In another embodiment, a user provides the default quantity amount. The user may select a settings icon, which opens a settings window. The user then inputs a desired default quantity amount in the settings window.

In another embodiment, the default settings may be taken from the headline bid or the headline offer for a specific strike level. For example, referring to FIG. 5, if the user taps on market box 330, then entry window 500 may populate quantity input 502 with "100" and price input 504 with "62." In yet another example, the user taps on icon 356 and then indicates whether she wishes to buy or sell. Depending on her selection, order entry 500 populates with either the corresponding headline bid or offer prices.

The user also may wish to change the default settings for quantity input 502 and price input 504. In one embodiment, the user taps on quantity input 502 or price input 504, which causes a keyboard to superimpose over binary options interface 300. Using the keyboard, the user can type in the desired quantity and price into their respective input boxes. In another embodiment, entry window 500 includes indicator buttons, such as up/down arrows, plus/minus, etc. The user taps on these indicator buttons to adjust the amount listed in quantity input 502 and price input 504. In yet another embodiment, the user can make global changes to the default settings.

In another embodiment, the default settings may be derived from a previous transaction, so that if the user placed an order with a quantity of 2, then for the next order, order entry window will automatically input a quantity of 2 as the default setting.

Once the user is satisfied with the quantity and price being listed in entry window 500, she may submit her order to system 100.

Figure 6:
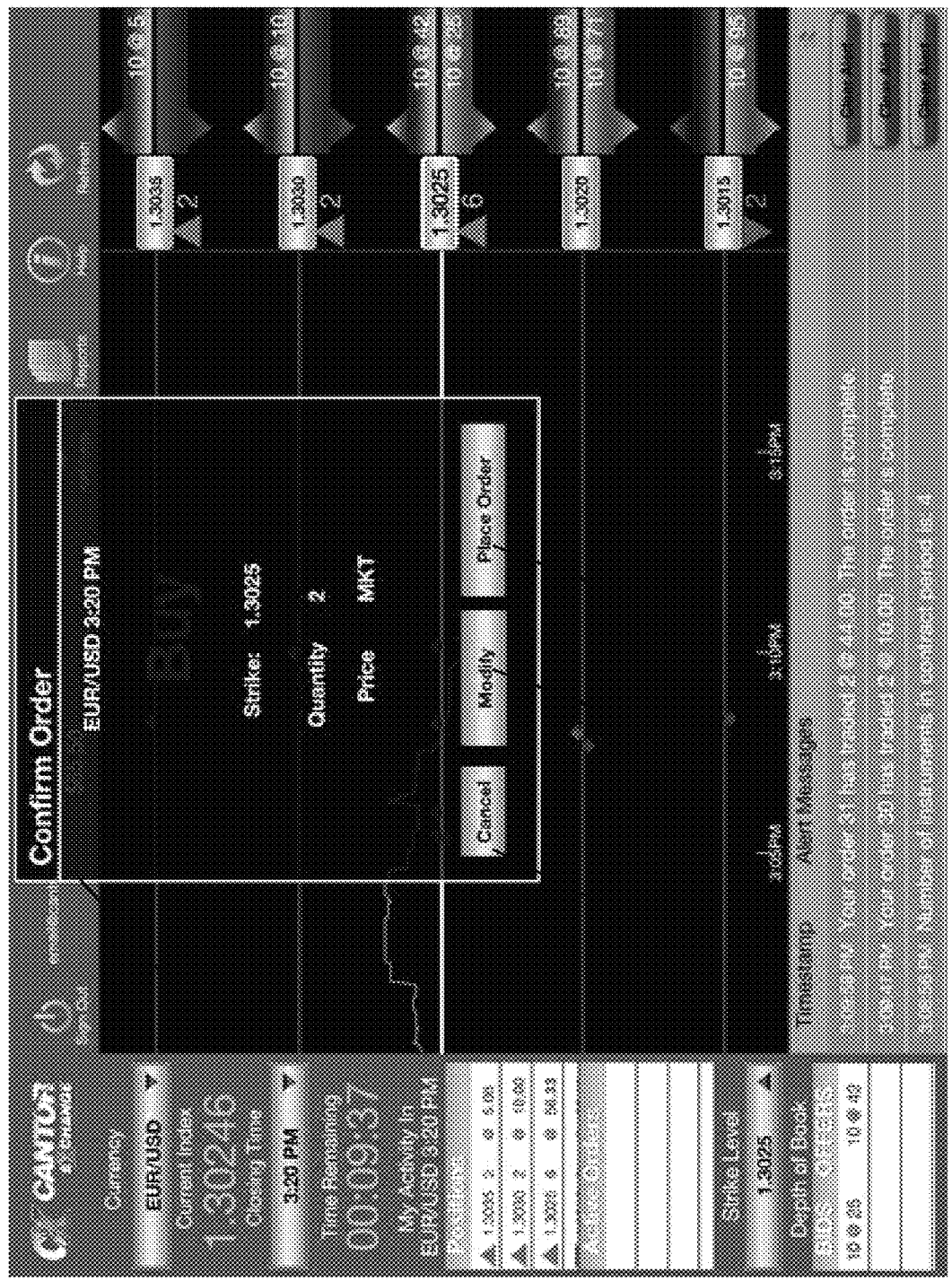
FIG. 6 illustrates an exemplary example of a confirmation window.

The user then indicates whether she wishes to purchase a call option (i.e., tap "Buy" button 508) or a put option (i.e. tap "Sell" button 410). She then selects confirmation button 512, which cause confirmation window 600 (as shown in FIG. 6) to replace order entry window 500.

Confirmation window 600 displays information about the pending transaction, such as the type of instrument, the closing time, the strike price, whether the order is a buy or sell order, the strike level, the desired quantity, the desired price, etc. If the user is satisfied with the information displayed in confirmation window 600, she selects button 602 to place the order. If the user wishes to cancel out of confirmation window 600, she simply selects button 604. In one embodiment, selecting button 604 returns the user to entry window 500. In another embodiment, selecting button 604 returns the user back to binary options interface 300.

Likewise, if the user wishes to change any of the information listed in confirmation window 600, she may selects button 606 to modify. By selecting button 606, the user is returned to entry window 500, where she can change the desired quantity, desired price and whether she wishes for the order to be a "Buy" or a "Sell". If the user wishes to make any additional changes, such as changing the type of instrument, closing time and/or the strike level, then she can select cancel button 514 on entry window 500, as shown in FIG. 5. By selecting cancel button 514, she closes entry window 500 from binary options interface 300.

In another embodiment, the user may chose to streamline the transaction process by eliminating confirmation window 600. In one embodiment, the user may indicate this preference in a settings option. In such instances where the user desires to bypass confirmation window 500, a buy or sell order is directly submitted to system 100, upon the selection of confirmation button 512 in entry window 500.

Referring back to FIG. 3, after an order is placed, it may appear in box 358, which lists the open positions. Each entry in box 358 shows the quantity of contracts that have been purchased, the average price and the corresponding strike level. In the example shown in FIG. 3, the user has purchased 2 contracts at an average price of $64 each. These contracts will be "in the money" if the index closes above the strike price of 1.3025. The user also has purchase 1 contract at an average price of $80 for strike price 1.3020. If a user purchases both a bid and an offer for the same strike level, system 100 computes the difference and displays the remaining amount as a single entry in positions box 358. In one embodiment, the open positions also appear as an icon under corresponding strike level icons 348-356. In another embodiment, the open positions appear as an icon on corresponding strike lines 316-324.

In one embodiment, the user may modify or cancel the entry by tapping directly on the entry in positions box 360. In doing so, open entry window 500 pops open (FIG. 5). The user may modify or cancel the entry from entry window 500.

In one embodiment, the user may tap on a strike level icon 3448-356 to enter a limit order that allows the user to enter the maximum price that she is willing to pay. If there is no immediate match available in the market, these limit orders are displayed in box 360. These limit orders will remain in box 360 until a match become available. At which point, the orders will move to box 358.

In one embodiment, binary options interface 300 also includes status area 362, which shows status changes and other important messages. In one example, the message may alert the user that she is running low on money. In another example, the message notifies the user that an order has been completed.

Figure 7:
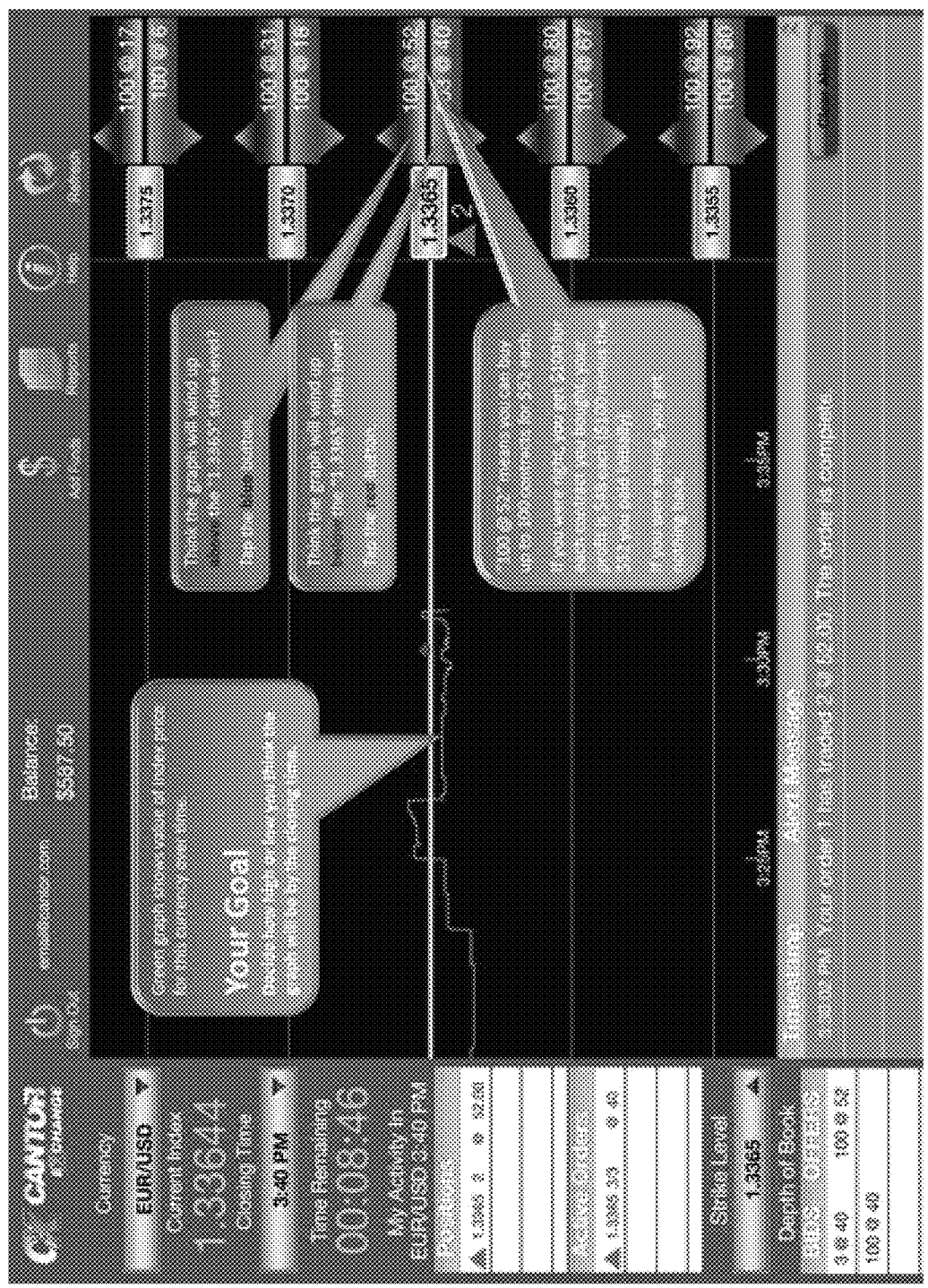
FIG. 7 illustrates an exemplary example of an introductory.

FIG. 7 illustrates a screenshot of binary options interface 300. In one embodiment, the user is greeted by an introductory page upon first opening the binary options application. The introductory page includes a plurality of comment bubbles, which explain the functionality of various portions of the binary options interface 300.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Additional Embodiments

A. A method comprising: receiving, via a processor, a plurality of bids and offers for a binary options instrument, in which each bid and offer comprises a quantity and a price; generating a subset of bids and offers from the plurality of received bids and offers; applying, via a processor, at least one rule to the subset of bids and offers to generate a reduced subset of bids and offers; computing, via a processor, a binary options index from the reduced subset of bids and offers; and receiving, from a remote device, a request for a binary options transaction that is based on the computed binary options index, in which the remote device and the processor are in electronic communication over a network.

A.0. The method of claim A further comprising: transmitting the computed binary options index to be displayed. A.1. The method of claim A, in which receiving the plurality of bids and offers comprises: receiving at a mobile device. A.2. The method of claim A, in which the mobile device is a tablet device. A.3. The method of claim A in which the binary options instrument comprises a risk derivative that is subject to an affirmative or negative answer. A.4. The method of claim A in which the binary options instrument comprises at least one of: a financial instrument, a S&P 500 index, an oil & gas index, a real estate index, a futures index.

A.5. The method of claim A further comprising: updating the plurality received of bids and offers. A.5.1. The method of claim A.5, in which the updating the received plurality of bids and offers occurs at a sampling rate. A.5.1.1. The method of claim A.5.1, in which the sampling rate comprises every half second.

A.6. The method of claim A further comprising: computing a weighted value for each bid and offer, in which the weight value comprises a combination of a price and a quantity of each bid and offer. A.6.1. The method of claim A.6, in which the at least one rule is applied against the weighted value of each bid or offer.

A.7. The method of claim A, in which the subset of bids and offers comprises a portion of the plurality of bids and offers. A.8. The method of claim A, in which the subset of bids and offers comprises all of the received bids and offers. A.9. The method of claim A, in which generating the subset of bids and offers comprises: selecting a quantity of recently received bids and offers. A.9.1. The method of claim A.9, in which the quantity of recently received bids and offers is 6.

A.10. The method of claim A, in which generating the subset of bids and offers comprises: selecting the bids and offers received within a period of time.

A.11. The method of claim A, in which the applying the at least one rule to the subset of bids and offers comprises: sorting the plurality of bids and offers; and removing at least one of: a highest bid, a highest offer, a lowest bid and a lowest offer. A.12. The method of claim A, in which applying the at least one rule to the subset of bids and offers comprises: removing a bid or an offer that comprises a specific value. A.12. The method of claim A.12, in which the specific value is determined in advance of the binary options transaction. A.13. The method of claim A, in which applying the at least one rule to the subset of bids and offers comprises: removing any bid or offers that fall within a specific window of values. A.14. The method of claim A, in which applying the at least one rule to the subset of bids and offers comprises: removing a bid or an offer that the exceeds a threshold. A.14.1. The method of claim A.14, in which the threshold is a maximum price threshold. A.14.2. The method of claim A.14, in which the threshold is a maximum quantity threshold. A.14.3. The method of claim A.14, in which the threshold is determined in advance of the binary options transaction. A.15. The method of claim A, in which applying the at least one rule to the subset of bids and offers comprises: removing a bid or an offer that the fails to meet a threshold. A.15.1. The method of claim A.15, in which the threshold is a minimum price threshold. A.15.2. The method of claim A.15, in which the threshold is a minimum quantity threshold. A.15.3. The method of claim A.15, in which the threshold is determined in advance of the binary options transaction. A.16. The method of claim A, in which applying the at least one rule to the subset of bids and offers comprises: removing a bid or an offer that falls outside a standard of deviation. A.16. The method of claim A.16, in which the standard of deviation is determined in advance of the binary options transaction.

A.17. The method of claim A further comprising: determining a pattern from the plurality of received bids and offers; and deviating from the pattern. A.17.1. The method of claim A.17, in which the pattern is an order position in which a bid or an offer is received; and removing any bids and offers with the order position. A.17.1. The method of claim A.17.1, in which the order position is determined by a random number generator. A.17.2. The method of claim A.17, in which the pattern is a specific value; and removing any bids and offers with the specific value. A.17.3. The method of claim A.17, in which the pattern is a specific window of values; and removing any bids and offers having values within the specific window of values. A.18. The method of claim A, in which applying the at least one rule to the plurality of bids and offers comprises: randomly removing a bid or an offer. A.19. The method of claim A further comprising: determining that a bid or an offer is potentially manipulative; and transmitting an alert that the bid or the offer that is potentially manipulative. A.20. The method of claim A further comprising: determining that a bid or an offer is potentially manipulative; determining a source that submitted the bid or the offer that is potentially manipulative; and transmitting an alert regarding the source. A.20.1. The method of claim A.20. further comprising: determining that the source has received a quantity of alerts that exceeds a threshold; and automatically preventing the source from submitted any more bids or offers. A.20.2. The method of claim A.20. further comprising: determining that the source has received a quantity of alerts that exceeds a threshold; and transmitting a message to a system administrator.

A.21. An apparatus comprising: a processor; and a memory, in which the memory stores instructions which, when executed by the processor, direct the processor to: receive a plurality of bids and offers for a binary options instrument, in which each bid and offer comprises a quantity and a price; generate a subset of bids and offers from the plurality of received bids and offers; apply at least one rule to the subset of bids and offers to generate a reduced subset of bids and offers; compute a binary options index from the reduced subset of bids and offers; transmit the computed binary options index to be displayed; and receive a request for a binary options transaction that is based on the computed binary options index.

A.22. An article of manufacture comprising: a computer-readable medium that is non-transitory, in which the computer-readable medium stores instructions which, when executed by a processor, direct the processor to: receive a plurality of bids and offers for a binary options instrument, in which each bid and offer comprises a quantity and a price; generate a subset of bids and offers from the plurality of received bids and offers; apply at least one rule to the subset of bids and offers to generate a reduced subset of bids and offers; compute a binary options index from the reduced subset of bids and offers; transmit the computed binary options index to be displayed; and receive a request for a binary options transaction that is based on the computed binary options index.

B. A method comprising: receiving, via a processor, a plurality of bids and offers for a binary options transaction, in which each bid and offer comprises a quantity and a price; applying, via a processor, at least one rule to the plurality of received bids and offers; determining, via a processor, that at least one of the plurality of bids and offers is potentially manipulative; and transmitting to a remote device an alert the at least one bid or offer that is potentially manipulative, in which the remote device and the processor are in electronic communication over a network. B1. The method of claim B in which applying the at least one rule to the plurality of received bids and offers comprises: determining a pattern from the plurality of received bids and offers; and determining any bids or offers that deviate from the pattern. B.1.1. The method of claim B.1. further comprises: removing any bids of offers that deviate from the pattern. B2. The method of claim B in which applying the at least one rule to the plurality of bids and offers comprises: determining that a bid or an offer that falls outside a standard of deviation. B.2.1. The method of claim B.2. further comprising: removing the bid or the offer that falls outside the standard of deviation.

B3. The method of claim B in which applying the at least one rule to the plurality of bids and offers comprises: determining that a bid or an offer exceeds a threshold amount. B.3.1. The method of claim B.3, in which the threshold amount is a maximum quantity amount. B.3.2. The method of claim B.3, in which the threshold amount is a maximum price amount. B.3.3. The method of claim B.3, in which the threshold amount is a quantity amount and a price amount. B.3.4. The method of claim B.3. further comprising: removing any bids or offers that exceeds the threshold amount. B.3.5. The method of claim B.3, in which the threshold amount is determined in advance of receiving a binary options transaction. B4. The method of claim B in which applying the at least one rule to the plurality of bids and offers comprises: determining that a bid or an offer fails to meet a threshold amount. B.4.1. The method of claim B.4, in which the threshold amount is a minimum quantity amount. B.4.2. The method of claim B.4, in which the threshold amount is a minimum price amount. B.4.3. The method of claim B.4, in which the threshold amount is a quantity amount and a price amount. B.4.4. The method of claim B.4. further comprising: removing any bids or offers that fails to meet the threshold amount. B.4.5. The method of claim B.4, in which the threshold amount is determined in advance of receiving a binary options transaction.

B.5. The method of claim B further comprises: determining a source of the bid or offer that is possibly manipulative. B.5.1. The method of claim B.5. further comprising: determining that the source has received a quantity of alerts that exceeds a threshold. B.5.1.1. The method of claim B.5.1. further comprising: automatically preventing the source from submitted any more bids or offers. B.5.1.2. The method of claim B.5.1. further comprising: transmitting a message about the quantity of alerts received by the source to a system administrator.

B.6. The method of claim B, in which the binary options transaction is based on a binary options instrument. B.6.1. The method of claim B in which the binary options instrument comprises a risk derivative that is subject to an affirmative or negative answer. B.6.2. The method of claim B in which the binary options instrument comprises at least one of: a financial instrument, a S&P 500 index, an oil & gas index, a real estate index, a futures index. B.7. The method of claim B further comprising: updating the received plurality of bids and offers. B.8. The method of claim B further comprising: selecting a subset of bids and offers from the plurality of bids and offers; and computing a binary options index from the reduced subset of bids and offers. B.8.1. The method of claim B.9. further comprising: transmitting the computed binary options index to be displayed. B.8.2. The method of claim B.8. further comprising: receiving a request for a binary options transaction that is based on the computed binary options index.

B.9. An apparatus comprising: a processor; and a memory, in which the memory stores instructions which, when executed by the processor, direct the processor to: receive a plurality of bids and offers for a binary options transaction, in which each bid and offer comprises a quantity and a price; apply at least one rule to the plurality of received bids and offers; determine that at least one of the plurality of bids and offers is potentially manipulative; and transmit an alert the at least one bid or offer that is potentially manipulative.

B.10. An article of manufacture comprising: a computer-readable medium that is non-transitory, in which the computer-readable medium stores instructions which, when executed by a processor, direct the processor to: receive a plurality of bids and offers for a binary options transaction, in which each bid and offer comprises a quantity and a price; apply at least one rule to the plurality of received bids and offers; determine that at least one of the plurality of bids and offers is potentially manipulative; and transmit an alert the at least one bid or offer that is potentially manipulative.

C. A method for providing seamless transitions between graphical images on a binary options interface, the method comprising: receiving, via a processor, an user-input on a touch-sensitive display of the binary options interface, in which the user-input corresponds to a request for a transformation of a graphical image that is displayed on the binary options interface and in which the binary options interface is integrated into a mobile device; generating, via the processor, in response to the user-input, an updated graphical image; displaying, via the processor, the updated graphical image to replace the graphical image on the binary options interface, in which a transition from the graphical image to the updated graphical image comprises a continuously displayed image.

C.1. The method of claim C, in which the graphical image corresponds to a binary options index. C.2. The method of claim C, in which the mobile device is a tablet device.

C.3. The method of claim C, in which the transformation is a scaling transformation. C.4. The method of claim C, in which the user-input is a stretch-to-expand gesture. C.4.1. The method of claim C.4, in which the scaling transformation comprises zooming in on the graphical image. C.4.2. The method of claim C.4, in which the updated graphical image is an enlarged image of the graphical image. C.5. The method of claim C, in which the user-input is a pinch-to-shrink gesture. C.5.1. The method of claim C.5, in which the scaling transformation comprises zooming out from the graphical image. C.5.2. The method of claim C.5, in which the updated graphical image is a reduced image of the graphical image.

C.6. The method of claim C, in which generating the updated graphical image further comprises: identifying at least two data points on the graphical image; and generating a first graphical image by interpolating the at least two data points; displaying the first graphical image to replace the graphical image on the binary options interface; retrieving actual data points that correspond to the requested scaling transformation; and generating an updated graphical image to replace the first graphical image. C.6.1. The method of claim C.6. further comprising: displaying the updated graphical image to replace the first graphical image, which the updated graphical image is generated from the actual data points.

C.7. The method of claim C, in which generating the updated graphical image further comprises: in response to receiving an indication of a trigger, retrieving, in advance of receiving the request for the transformation, data points that correspond to the updated graphical image. C.7.1. The method of C.7, in which the trigger comprises: detecting a finger pressure at a location on the touch-sensitive display, in which the location corresponds to a position on the graphical image; and retrieving the data points within an area of the position, in which at least a portion of the data points within the area of the position are used to generate the updated graphical image. C.7.1.1. The method of claim C.7.1, in which the area is defined in advance of receiving the request for the transformation.

C.7.2. The method of C.7. in which the trigger comprises: detecting a stretch-to-expand gesture. C.7.2.1. The method of claim C.7.2. further comprising: retrieving data points that correspond to a subsequent stretch-to-expand gesture, in which at least a portion of the data points are used to generate the updated graphical image. C.7.2.2. The method of claim C.7.2. further comprising: retrieving data points that correspond to a subsequent pinch-to-shrink gesture, in which at least a portion of the data points are used to generate the updated graphical image. C.7.2.3. The method of claim C.7.2. further comprising: retrieving data points that correspond to a subsequent stretch-to-expand gesture and pinch-to-shrink gesture, in which at least a portion of the data points are used to generate the updated graphical image. C.7.3. The method of C.7, in which the trigger comprises: detecting a quantity of stretch-to-expand gestures; and retrieving data points that correspond to a subsequent stretch-to-expand gesture, in which at least a portion of the data points are used to generate the updated graphical image. C.7.4. The method of C.7, in which the trigger comprises: detecting a pinch-to-shrink gesture. C.7.4.1. The method of claim C.7.4. further comprising: retrieving data points that correspond to a subsequent pinch-to-shrink gesture, in which at least a portion of the data points are used to generate the updated graphical image. C.7.4.2. The method of claim C.7.4 further comprising: retrieving data points that correspond to a subsequent stretch-to-expand gesture, in which at least a portion of the data points are used to generate the updated graphical image. C.7.4.3. The method of claim C.7.4 further comprising: retrieving data points that correspond to a subsequent pinch-to-shrink gesture and stretch-to-expand gesture, in which at least a portion of the data points are used to generate the updated graphical image. C.7.5. The method of C.7, in which the trigger comprises: detecting a quantity pinch-to-shrink gesture; and retrieving data points that correspond to a subsequent pinch-to-shrink gesture, in which at least a portion of the data points are used to generate the updated graphical image. C.7.6. The method of C.7. in which the trigger comprises: detecting a stretch-to-expand gesture or a pinch-to-shrink gesture. C.7.6.1. The method of claim C.7.6. further comprising: retrieving data points that correspond to a subsequent stretch-to-expand gesture and pinch-to-shrink gesture, in which at least a portion of the data points are used to generate the updated graphical image.

C.8. The method of C, in which generating the updated graphical image further comprises: detecting a perimeter of the graphical image; retrieving data points within an area of the perimeter, in which at least a portion of the data points are used to generate the updated graphical image. C.9. The method of claim C, in which the user-input is a scrolling gesture. C.9.1. The method of C.9, in which generating the updated graphical image further comprises: detecting a perimeter of the graphical image; retrieving data points within an area outside the perimeter, in which at least a portion of data points are used to generate the updated graphical image. C.9.2. The method of claim C.9.1, in which the area is determined in advance of receiving the request for the transformation.

C.10. An apparatus for providing seamless transitions between graphical images on a binary options interface, the apparatus comprising: a processor; and a memory, in which the memory stores instructions which, when executed by the processor, direct the processor to: receive an user-input on a touch-sensitive display of the binary options interface, in which the user-input corresponds to a request for a transformation of a graphical image that is displayed on the binary options interface and in which the binary options interface is integrated into a mobile device; generate, in response to the user-input, an updated graphical image; display the updated graphical image to replace the graphical image on the binary options interface, in which a transition from the graphical image to the updated graphical image comprises a continuously displayed image.

C.11. An article of manufacture for providing seamless transitions between graphical images on a binary options interface, the article of manufacture comprising: a computer-readable medium that is non-transitory, in which the computer-readable medium stores instructions which, when executed by a processor, direct the processor to: receive an user-input on a touch-sensitive display of the binary options interface, in which the user-input corresponds to a request for a transformation of a graphical image that is displayed on the binary options interface and in which the binary options interface is integrated into a mobile device; generate, in response to the user-input, an updated graphical image; display the updated graphical image to replace the graphical image on the binary options interface, in which a transition from the graphical image to the updated graphical image comprises a continuously displayed image.

The following sections provide a guide to interpreting the present application.

III. Terms

The term "product" means any machine, manufacture and/or composition of matter, unless expressly specified otherwise.

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

IV. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

V. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

VI. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VII. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VIII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

IX. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

X. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

XI. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XII. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XIII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

The invention claimed is:

1. A method comprising:
receiving, via at least one processor of at least one computer in electronic communication with a plurality of other computers via an electronic communications network, a plurality of bids and offers for a binary options transaction in a marketplace, in which each bid and offer comprises a quantity and a price, in which each bid and offer of the plurality of bids and offers is received over the electronic communications network from at least one of the plurality of other computers;
applying, via the at least one processor, at least one rule to the plurality of received bids and offers, in which applying the at least one rule comprises:
determining a subset of the plurality of received bids and offers by removing at least one bid or offer from the received plurality of bids and offers based on at least one of order price and order quantity, the subset of the received plurality of bids and offers comprising less than all of the plurality of received bids and offers and comprising at least one bid or offer that has not yet been executed;
determining, via the at least one processor, that at least one of the plurality of bids and offers is a manipulative order indicating a deliberate attempt to interfere with free trade in the marketplace, the manipulative order comprising an electronic instruction comprising one of a manipulative bid to purchase and a manipulative offer to sell, in which the act of determining that at least one of the plurality of bids and offers is a manipulative order comprises identifying the manipulative order before any executing of the manipulative order;
responsive to determining that at least one of the plurality of bids and offers is a manipulative order, transmitting, via the at least one processor to a remote device, an alert about the manipulative order, in which the remote device and the processor are in electronic communication over the electronic communications network, in which the alert indicates that the determined manipulative order is a manipulative order;
causing information about one or more of the received plurality of bids and offers to be displayed at an electronic display device in electronic communication with the at least one processor;
generating commands, via the at least one processor, to render a price graph on a graphical user interface of the display device of the remote device;

identifying, via the at least one processor, a perimeter around the price graph;
before receiving commands from a user of the remote device to request to display a region beyond the perimeter of the price graph, retrieving, via the at least one processor, a set of points associated with the region beyond the perimeter of the price graph;
in response to a receiving commands from a user of the remote device to request to display the region beyond the perimeter of the price graph, via the at least one processor, updating the display with the region beyond the perimeter of the price graph with the previously retrieved set of points associated with the region beyond the perimeter of the price graph;
receiving, via the at least one processor, from the graphical user interface of the remote device, input which corresponds to a request for a transformation of a graphical image that is displayed on the graphical user interface of the remote device;
displaying, via the at least one processor, an updated graphical image to replace the graphical image on the graphical user interface of the remote device, in which a transition from the graphical image to the updated graphical image comprises a continuously displayed image;
receiving, via the at least one processor, from the graphical user interface of the remote device, input which corresponds to a user gesture resulting in a scaling transformation which changes the frequency by which time intervals are sampled; and
retrieving, via the at least one processor, data points within a pre-defined area surrounding the position in anticipation of a user gesture resulting in transition of an image to an updated image in a continuous manner.

2. The method of claim 1, in which applying the at least one rule to the plurality of received bids and offers comprises:
determining a pattern from the plurality of received bids and offers; and
determining any bids or offers that deviate from the pattern.

3. The method of claim 2, in which the act of determining a subset of the plurality of received bids and offers further comprises:
removing any bids or offers that deviate from the pattern.

4. The method of claim 1 in which applying the at least one rule to the plurality of bids and offers comprises:
determining a bid or an offer that falls outside a standard of deviation.

5. The method of claim 1 in which applying the at least one rule to the plurality of bids and offers comprises:
determining a bid or an offer exceeds or fails to meet a threshold amount.

6. The method of claim 5, in which the threshold amount is a maximum or minimum quantity amount.

7. The method of claim 5, in which the threshold amount is a maximum or minimum price amount.

8. The method of claim 5, in which the threshold amount is a quantity amount and a price amount.

9. The method of claim 5 further comprising:
identifying a source that submitted the manipulative order.

10. The method of claim 9, further comprising:
determining a quantity of alerts associated with the source exceeds a threshold amount.

11. The method of claim 10 further comprising:
in response to determining that the quantity of alerts associated with the source exceeds the threshold amount, automatically rejecting any more bids or offers that are submitted by the source.

12. The method of claim 10 further comprising:
transmitting a message about the quantity of alerts to a system administrator.

13. The method of claim 1, in which the binary options transaction is based on a binary options instrument, and
in which the act of determining a subset of the plurality of received bids and offers further comprises:
randomly selecting one or more of the received plurality of bids and offers to be removed; and
removing the randomly selected one or more of the received plurality of bids and offers from the plurality of bids and offers.

14. The method of claim 1 in which the binary options instrument comprises a risk derivative that is subject to an affirmative or negative answer.

15. The method of claim 1 further comprising:
updating the received plurality of bids and offers.

16. The method of claim 1 further comprising:
computing a binary options index from the determined subset of the plurality of bids and offers.

17. The method of claim 16 further comprising:
transmitting the computed binary options index over the electronic communications network; and
causing the computed binary options index to be displayed at the electronic display device.

18. The method of claim 16 further comprising:
receiving a request for a binary options transaction that is based on the computed binary options index.

19. An apparatus comprising:
at least one processor of at least one computer in electronic communication with a plurality of other computers via an electronic communications network; and
a memory, in which the memory stores instructions which, when executed by the at least one processor, direct the at least one processor to:
receive a plurality of bids and offers for a binary options transaction in a marketplace, in which each bid and offer comprises a quantity and a price, in which each bid and offer of the plurality of bids and offers is received over the electronic communications network from at least one of the plurality of other computers;
apply at least one rule to the plurality of received bids and offers, in which the act of applying the at least one rule comprises:
determining a subset of the plurality of received bids and offers by removing at least one bid or offer from the received plurality of bids and offers based on at least one of order price and order quantity, the subset of the received plurality of bids and offers comprising less than all of the plurality of received bids and offers and comprising at least one bid or offer that has not yet been executed;
determine that at least one of the plurality of bids and offers is a manipulative order indicating a deliberate attempt to interfere with free trade in the marketplace, the manipulative order comprising an electronic instruction comprising one of a manipulative bid to purchase and a manipulative offer to sell, in which the act of determining that at least one of the plurality of bids and offers is a manipulative order comprises identifying the manipulative order before any executing of the manipulative order;

responsive to determining that at least one of the plurality of bids and offers is a manipulative order, transmit an alert about the manipulative bid to a remote device via the electronic communications network, in which the alert indicates that the determined manipulative order is a manipulative order;

cause information about one or more of the received plurality of bids and offers to be displayed at an electronic display device in electronic communication with the at least one processor;

generate commands, via the at least one processor, to render a price graph on a graphical user interface of the display device of the remote device;

identifying, via the at least one processor, a perimeter around the price graph;

before receiving commands from a user of the remote device to request to display a region beyond the perimeter of the price graph, retrieve, via the at least one processor, a set of points associated with the region beyond the perimeter of the price graph;

in response to a receiving commands from a user of the remote device to request to display the region beyond the perimeter of the price graph, via the at least one processor, update the display with the region beyond the perimeter of the price graph with the previously retrieved set of points associated with the region beyond the perimeter of the price graph;

receive from the graphical user interface of the remote device, input which corresponds to a request for a transformation of a graphical image that is displayed on the graphical user interface of the remote device;

display an updated graphical image to replace the graphical image on the graphical user interface of the remote device, in which a transition from the graphical image to the updated graphical image comprises a continuously displayed image;

receive, from the graphical user interface of the remote device, input which corresponds to a user gesture resulting in a scaling transformation which changes the frequency by which time intervals are sampled; and retrieve data points within a pre-defined area surrounding the position in anticipation of a user gesture resulting in transition of an image to an updated image in a continuous manner.

20. An article of manufacture comprising:

a computer-readable medium that is non-transitory, in which the computer-readable medium stores instructions which, when executed by at least one processor of at least one computer in electronic communication with a plurality of other computers via an electronic communications network, direct the at least one processor to:

receive a plurality of bids and offers for a binary options transaction in a marketplace, in which each bid and offer comprises a quantity and a price, in which each bid and offer of the plurality of bids and offers is received over the electronic communications network from at least one of the plurality of other computers;

apply at least one rule to the plurality of received bids and offers, in which the act of applying the at least one rule comprises:

determining a subset of the plurality of received bids and offers by removing at least one bid or offer from the received plurality of bids and offers based on at least one of order price and order quantity, the subset of the received plurality of bids and offers comprising less than all of the plurality of received bids and offers and comprising at least one bid or offer that has not yet been executed;

determine that at least one of the plurality of bids and offers is a manipulative order indicating a deliberate attempt to interfere with free trade in the marketplace, the manipulative order comprising an electronic instruction comprising one of a manipulative bid to purchase and a manipulative offer to sell, in which the act of determining that at least one of the plurality of bids and offers is a manipulative order comprises identifying the manipulative order before any executing of the manipulative order;

responsive to determining that at least one of the plurality of bids and offers is a manipulative order, transmit an alert about the manipulative bid, in which the alert indicates that the determined manipulative order is a manipulative order;

cause information about one or more of the received plurality of bids and offers to be displayed at an electronic display device in electronic communication with the at least one processor;

generate commands, via the at least one processor, to render a price graph on a graphical user interface of the display device of the remote device;

identifying, via the at least one processor, a perimeter around the price graph;

before receiving commands from a user of the remote device to request to display a region beyond the perimeter of the price graph, retrieve, via the at least one processor, a set of points associated with the region beyond the perimeter of the price graph;

in response to a receiving commands from a user of the remote device to request to display the region beyond the perimeter of the price graph, via the at least one processor, update the display with the region beyond the perimeter of the price graph with the previously retrieved set of points associated with the region beyond the perimeter of the price graph;

receive from the graphical user interface of the remote device, input which corresponds to a request for a transformation of a graphical image that is displayed on the graphical user interface of the remote device;

display an updated graphical image to replace the graphical image on the graphical user interface of the remote device, in which a transition from the graphical image to the updated graphical image comprises a continuously displayed image;

receive, from the graphical user interface of the remote device, input which corresponds to a user gesture resulting in a scaling transformation which changes the frequency by which time intervals are sampled; and retrieve data points within a pre-defined area surrounding the position in anticipation of a user gesture resulting in transition of an image to an updated image in a continuous manner.

* * * * *